(12) United States Patent
Staton et al.

(10) Patent No.: US 6,871,661 B2
(45) Date of Patent: Mar. 29, 2005

(54) COMBINATION FITTING

(75) Inventors: Timothy Staton, Ypsilanti, MI (US);
Shawn P. Capser, Monroe, MI (US);
Kevin S. Bockstanz, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/924,568

(22) Filed: Aug. 24, 2004

(65) Prior Publication Data

US 2005/0016587 A1 Jan. 27, 2005

Related U.S. Application Data

(62) Division of application No. 10/040,515, filed on Dec. 28, 2001, now Pat. No. 6,799,602.

(51) Int. Cl.[7] .......................... F04B 49/00; B62D 5/065
(52) U.S. Cl. ................. 137/1; 137/115.03; 137/115.09; 137/565.35; 60/468; 60/494
(58) Field of Search ...................... 60/468, 494; 137/1, 137/115.03, 115.09, 115.13, 565.13, 565.35; 138/40, 44

(56) References Cited

U.S. PATENT DOCUMENTS

| | | | |
|---|---|---|---|
| 2,501,593 A | 3/1950 | Becker | |
| 3,072,261 A | 1/1963 | Smith | |
| 3,921,672 A | 11/1975 | Arnold | |
| 4,192,337 A | 3/1980 | Alderson et al. | |
| 4,234,008 A | 11/1980 | Cronfel | |
| 4,401,417 A | 8/1983 | Davis | |
| 4,426,198 A | 1/1984 | Bastenhof et al. | |
| 4,429,708 A | 2/1984 | Strueh | |
| 4,700,733 A | 10/1987 | Uchino et al. | |
| 5,170,626 A | 12/1992 | Ohtaki et al. | |
| 5,192,196 A | 3/1993 | Gettel | |
| 5,220,939 A | 6/1993 | Hamasaki et al. | |
| 5,333,454 A | 8/1994 | Nikaido | |
| 5,775,361 A | 7/1998 | Phillips | |
| 5,832,949 A | 11/1998 | Hayashi et al. | |
| 5,863,129 A | 1/1999 | Smith | |
| 5,899,293 A | 5/1999 | Ono | |
| 5,937,909 A | 8/1999 | Clauss et al. | |
| 6,155,797 A | 12/2000 | Kazuyoshi | |
| 6,568,500 B1 * | 5/2003 | Krieger et al. | 180/442 |
| 6,799,602 B2 * | 10/2004 | Staton et al. | 137/565.35 |

FOREIGN PATENT DOCUMENTS

| | | |
|---|---|---|
| EP | 0 752 361 A1 | 1/1997 |
| GB | 2310029 A | 8/1997 |

* cited by examiner

*Primary Examiner*—Ramesh Krishnamurthy
(74) *Attorney, Agent, or Firm*—Brinks Hofer Gilson & Lione

(57) ABSTRACT

A combination fitting for flow control devices in an automotive power steering system having channels disposed in the fluid receiving end of the fitting.

20 Claims, 6 Drawing Sheets

COMBINATION FITTING

CROSS-REFERENCE TO RELATED PATENT APPLICATIONS

This patent application is a divisional of U.S. patent application Ser. No. 10/040,515, filed Dec. 28, 2001 now U.S. Pat. No. 6,799,602.

FIELD OF THE INVENTION

The present invention relates to flow control devices for hydraulic systems, and more particularly combination fittings for regulating the flow of pressurized fluid in an automobile power steering system.

BACKGROUND OF THE INVENTION

In automotive power steering systems, the flow of fluid delivered to the power steering equipment must be controlled in accordance with the requirements of the steering gear. In these systems, a pump, which is the source of the delivered fluid is provided with a flow control apparatus, typically a flow control valve. Typically, hydraulic flow is controlled by a piston that moves reciprocally in a flow control cylinder to open and close a bypass hole. Hydraulic flow is delivered from the pump to an output chamber formed between a high-pressure end of the piston in the flow control cylinder and an output or combination fitting. Fluid from the output chamber passes through a bore in the fitting and on to the power steering system.

A pressure-sensing orifice in the fitting transfers the pressure of the fluid flowing to the steering system and delivers the pressure through a passage in the housing of the flow control assembly to a low-pressure chamber at the end of the piston. A compression spring in the low-pressure chamber forces the piston towards the fitting. A pressure force develops on the end of the piston due to the feedback pressure and combines with the spring force to keep the bypass port closed.

If the flow issuing from the pump outlet is too great and exceeds the force provided by the compression spring, the flow control piston will move away from the end of the fitting. As the piston moves away from the fitting, the piston partially or fully uncovers the bypass port to allow excess fluid to recirculate to the pump. When pressure demand increases, the spring forces the piston back toward the fitting to a new flow regulating position. Thus, the piston moves toward and away from the fitting in response to changes in the pressure system demand.

A problem often encountered with conventional flow control outlet fittings is undesirable fluctuations in fluid flow at high engine speeds. With the two-piece conventional fitting shown in FIG. 3, as the engine and pump speed increase, and the flow control piston moves to open the bypass valve, the forces acting on the front of the piston are unevenly applied and more fluid enters the bypass port than is desirable. Consequently, the fluid flow to the steering gear drops as shown at FIG. 8. As a result, there is an undesirable decrease in steering assist.

Another type of conventional flow control apparatus includes a fitting, shown in FIG. 4. This fitting 60 includes one end 62 that is in fluid communication with the pump outlet and faces the high-pressure end of the fluid control piston and a second end 64 through which fluid flows to the steering gear. The fitting 60 defines a bore 66 that runs the length of the fitting 60 that tapers with the direction of the fluid flow. With this type of fitting, as engine speed, and correspondingly pump speed increases, the flow of fluid to the steering gear rises and continues to rise. As a result, too much fluid flows to the steering gear and steering assist is undesirably increased.

BRIEF SUMMARY OF THE INVENTION

The scope of the invention is determined solely by the appended claims and their equivalents and is not affected to any degree by the statements within this summary. The invention provides a combination fitting for the regulation of fluid in a fluid control apparatus, preferably in an automotive power steering mechanism. Specifically, the combination fitting of the present invention addresses the disadvantages of conventional fittings by providing a combination fitting having channels in one end of the fitting that facilitates uniform or "flatter" fluid flow and reduces undesirable fluid fluctuations in the fluid control apparatus.

In accordance with one aspect of the present invention, a combination fitting is provided that includes a generally cylindrical member with a bore therethrough. The bore forms a fluid path through the fitting for the flow of fluid, and helps control the amount of fluid out from the pump to the power steering gear. At the fluid receiving end of the fitting, the bore is adjacent the high-pressure end of a fluid control piston and is in fluid communication with the hydraulic pump to receive fluid from the pump. The fluid-receiving end of the fitting has at least two and preferably four channels formed in the end of the fitting. The channels extend radially from the bore of the fitting.

In one embodiment, there are at least three, and preferably four channels extending radially from the bore of the fitting. In another embodiment, the channels having a rectangular cross-section. In yet another embodiment, the ratio of the length of the channels to the width of the channels is from about 14:1 to about to 5:3, preferably from about 10:1.5 to about 6:2.5, and more preferably about 7:2.33.

In a preferred embodiment, the four channels are regularly spaced at about 90° about the bore. In another preferred embodiment, the area of each of the channels defined by the width and the length of the channels is the same and ranges from about 15 mm$^2$ to about 17 mm$^2$, preferably about 16 mm$^2$ to 16.5 mm$^2$ and more preferably is about 16.3 mm$^2$.

DETAILED DESCRIPTION OF THE INVENTION

We have discovered that with conventional flow control output or combination fittings there is a problem of non-uniform fluid flow at higher engine speeds. Specifically, we have discovered that with conventional fittings, there is either too little or too much flow of fluid to the steering gear at higher engine speeds. At higher engine speeds, if fluid flow is decreased, steering assist is correspondingly decreased. With too much fluid flow, too much steering assist is provided. The present invention makes use of the discovery that channels formed in the fluid-receiving end of a combination fitting result in less fluctuations in fluid flow at higher engine speeds resulting in a more uniform flow of fluid to the steering gear and, correspondingly, more uniform steering assist.

Figure 1:
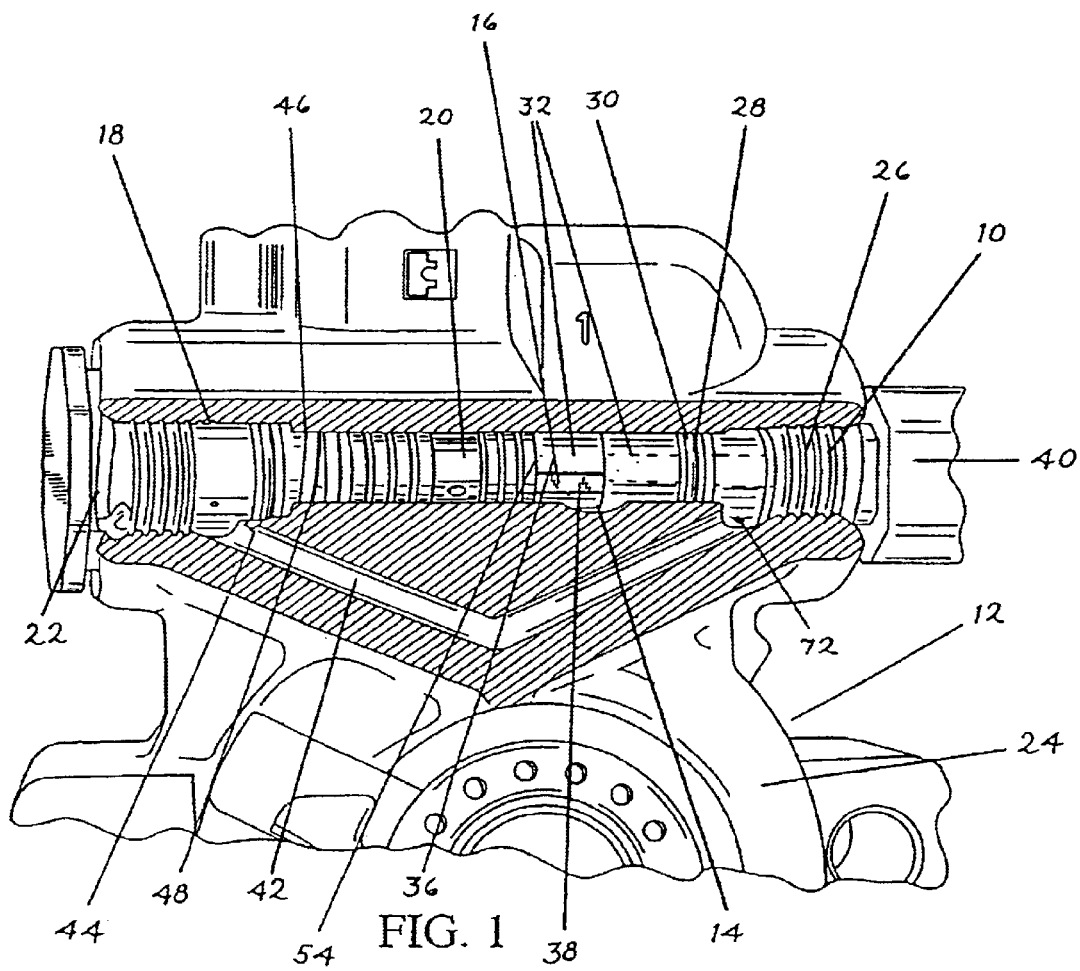
FIG. 1 is a cut away view of a fluid control apparatus with the combination fitting according to the present invention.
Figure 2:
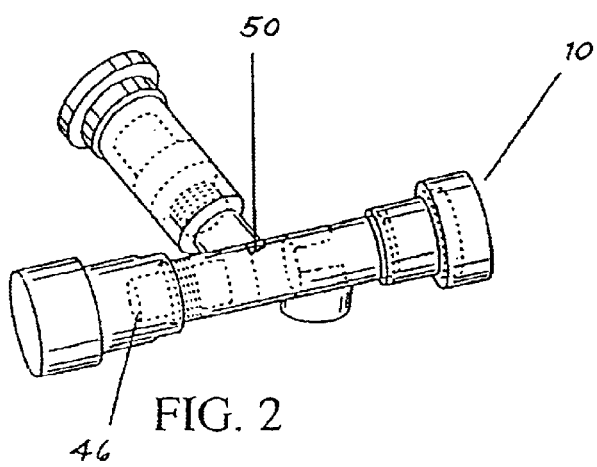
FIG. 2 is a perspective view of a portion of a conventional fluid control system with the combination fitting according to the present invention.
Figure 3:
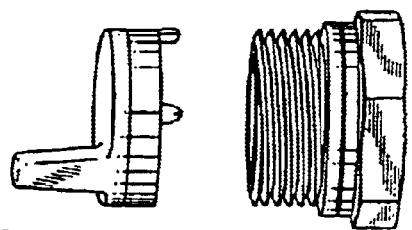
FIG. 3 is a side view of a conventional fitting.
Figure 4:
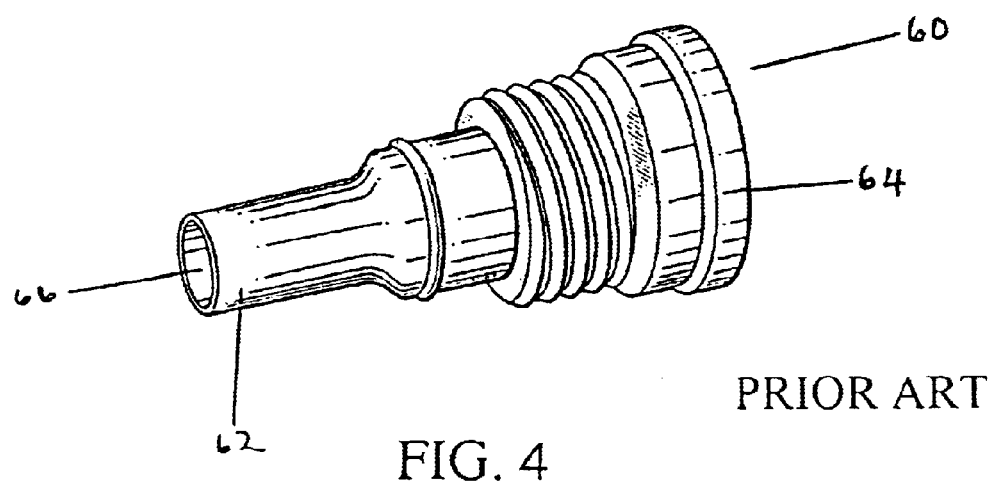
FIG. 4 is a side view of a conventional fitting.
Figure 5:
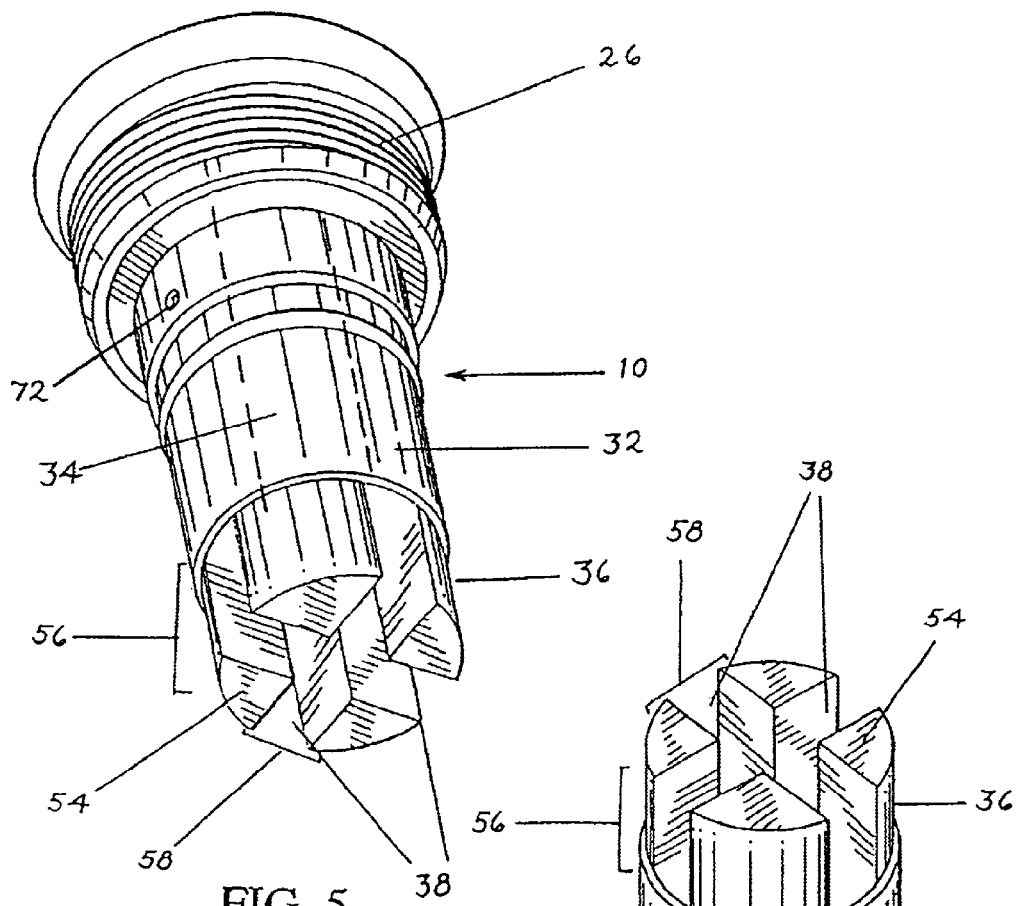
FIG. 5 is a perspective partial view of the combination fitting according to the present invention.
Figure 6:
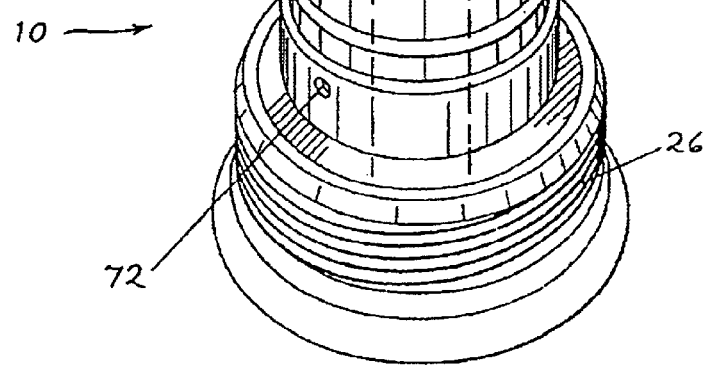
FIG. 6 is a perspective partial view of the combination fitting according to the present invention.
Figure 7A:
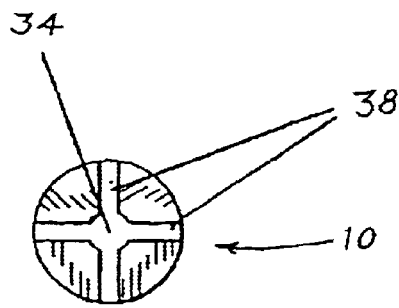
FIG. 7A is a top view of an embodiment of a combination fitting according to the present invention.
Figure 7B:
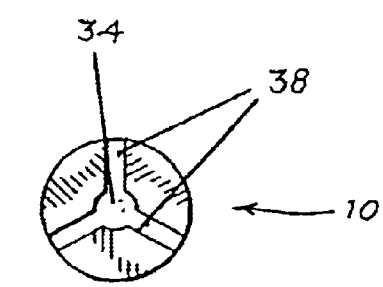
FIG. 7B is a top view of an embodiment of a combination fitting according to the pre sent invention.
Figure 7C:
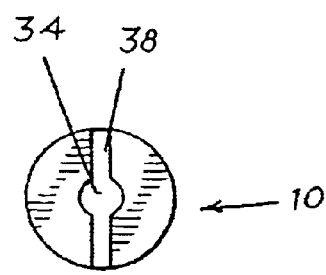
FIG. 7C is a top view of an embodiment of a combination fitting according to the present invention.
Figure 7D:
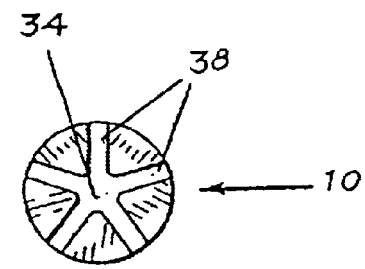
FIG. 7D is a top view of an embodiment of a combination fitting accord ing to the present invention.

The invention described herein, shown in FIGS. 1, 5 and 6, is an improvement of the combination fittings shown in FIGS. 3 and 4 for use in a conventional fluid flow control system of a power steering apparatus. A conventional fluid flow control system of a power steering apparatus is shown in FIG. 1 with the combination fitting 10 of the present invention. A supply of pressurized fluid from the pump 12 is delivered through a pump outlet port 14 in a housing 24 to an output chamber 16 formed in a fluid control cylinder 18 having a piston 20. The cylinder is closed at one end 22 of the cylinder 18 and is formed to receive the combination fitting 10 at the opposite end. The fitting 10 is mounted in the cylinder by threads 26. An O-ring 28 is disposed in a circumferential groove 30 to seal the cylinder.

As shown in FIGS. 5 and 6, extending from the fluid receiving end 36 of the fitting is a cylindrical member 32 having an axial passageway or bore 34 preferably defined therethrough. As discussed more fully below, the fluid receiving end 36 of the member 32 defines channels 38 extending radially from the bore 34.

In both fluid control devices with conventional fittings and fluid control devices with the combination fitting of the present invention, fluid from the pump outlet 14 passes through the bore 34 and delivers fluid to a coupler 40. The coupler is adapted to receive a fitting (not shown) of a hydraulic line for delivering the pressurized fluid to a power steering system.

A pressure-sensing orifice 72 within the fitting communicates with a passageway 42 in the housing 24. The passageway 42 communicates fluid from the pressure-sensing orifice into a low-pressure chamber 44 formed in the flow control cylinder at the low-pressure end 46 of the piston 20.

A compression spring 48 extends circumferentially around the low pressure end 46 of the piston 20 and urges the piston toward the fluid receiving end 36 of the member 32 of the combination fitting 10 as shown in FIG. 1. The piston is thus biased toward the fluid-receiving end 36 of the member 32 by the combined force of the spring 48 and the reduced pressure sensed by the pressure-sensing orifice (not shown) thereby preferably fully closing the excess fluid bypass port 50.

When the supply of pressurized fluid is insufficient to cause the piston 20 to move from its fully closed position, preferably the fluid passes through the channels 38 and, thus, through the fitting 10 to the steering system. As the supply of pressurized fluid increases, the piston 20 preferably moves from its fully closed position to partially or fully open the bypass port 50 and excess preferably fluid passes out through the bypass port 50 and is re-circulated to the pump.

With conventional fittings, at higher engine speeds, and consequently higher fluid flow rates, as the piston moves from its fully closed or biased position and excess fluid passes through the bypass port 50, the forces applied to the high-pressure end of the piston 20 become uneven, resulting in pressure fluctuations at the high-pressure end of the piston 20. This can result in highly unstable flow with corresponding undesirable flow and pressure emanating through the power steering system.

Figure 8:
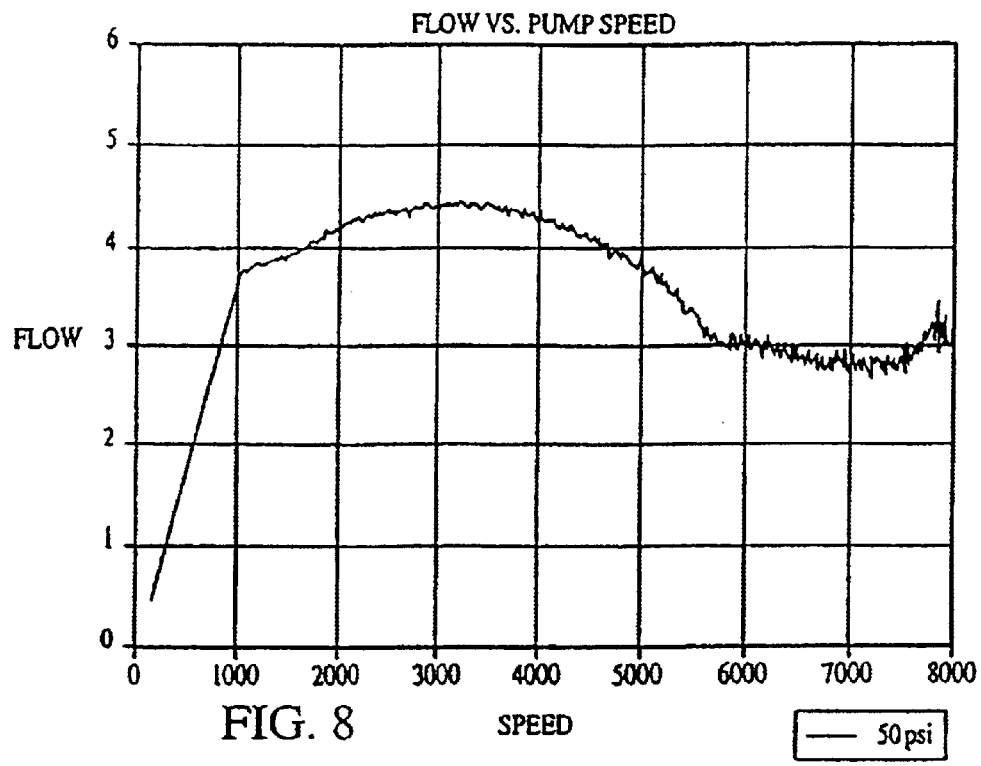
FIG. 8 is a graph showing the flow of fluid in fluid control apparatus with the conventional fitting of FIG. 3.
Figure 9:
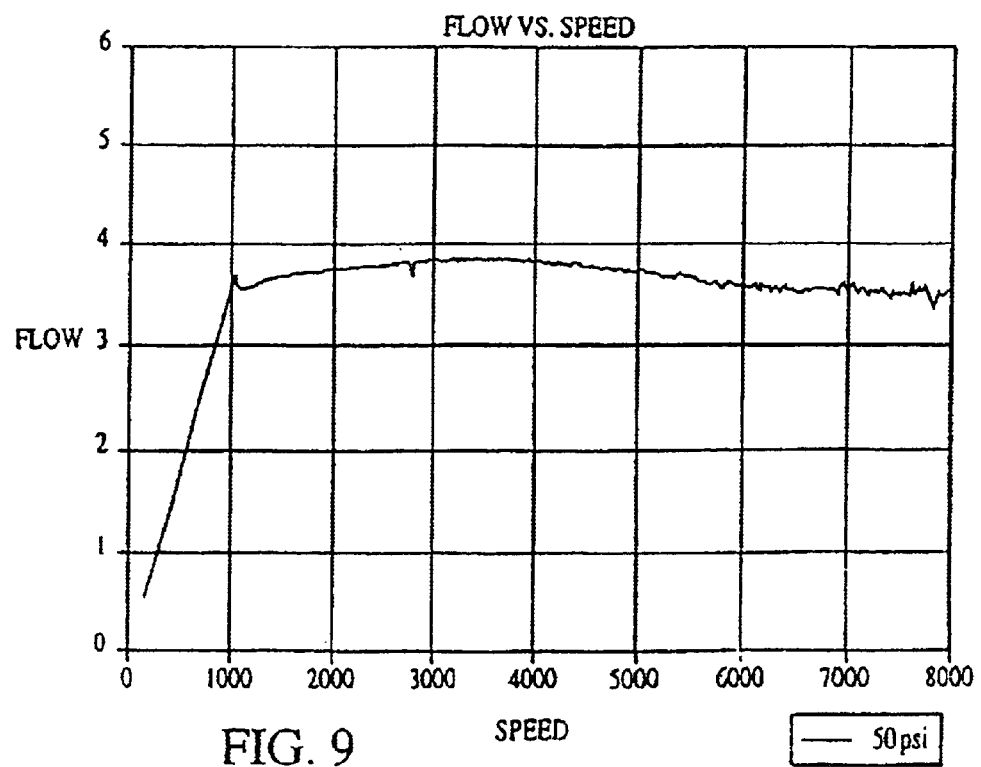
FIG. 9 is a graph showing the flow of fluid in fluid control apparatus with a combination fitting of the present invention.
Figure 10:
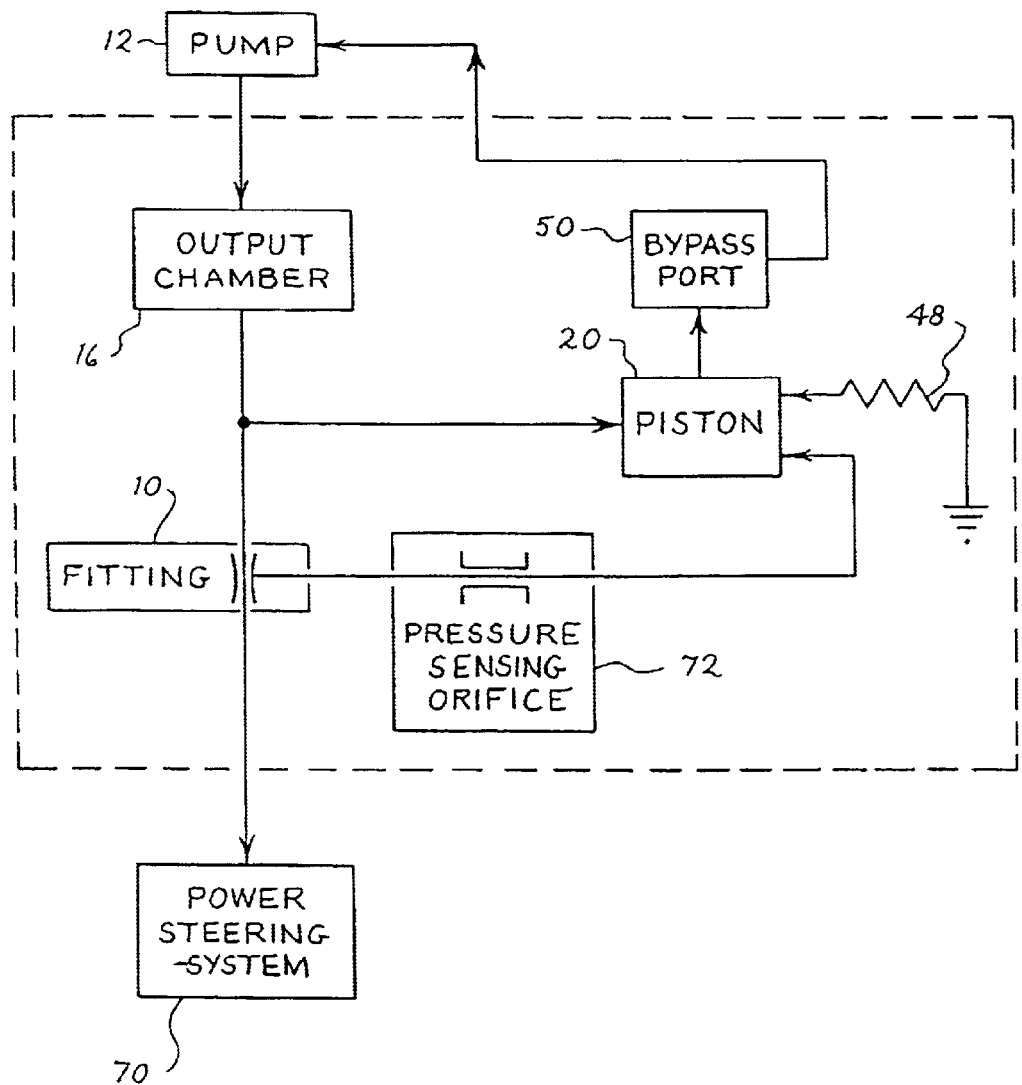
FIG. 10 is block diagram of a power steering system.

At high engine speeds, and concomitantly higher pump speeds, the channels 38 provided in the receiving end of the fitting 10 provide stabilization of the forces on the high pressure end of the piston 20 resulting in a flatter or more regular flow of fluid to the steering system. As shown graphically at FIG. 8, at high pump speeds, the fluid flow in a flow control device with a conventional fitting drops significantly. Fluid flow in a flow control device utilizing the combination fitting of the present invention, as shown graphically in FIG. 9, is stable across all pump speeds.

It is believed that the fitting of the present invention balances the forces acting on the piston by changing the angle of incidence of the forces on the front of piston.

FIGS. 5 and 6 show a combination fitting 10 according to one embodiment of the present invention. As illustrated in FIGS. 5 and 6 the combination fitting 10 is comprised of a cylindrical member 32 having a bore 34 therethrough. Channels 38 in the fluid receiving end 36 of the member 34 extend radially from the bore 34. At least two channels, preferably three, and more preferably four or more channels are provided in the fluid receiving end 36 of the member 32. In a preferred embodiment, as shown in FIGS. 5 and 6, two pairs, or four channels, are cross-cut into the piston facing face 54 of the receiving end 36 of the member 32. The result is a cross configuration in the face 54 of the receiving end 36 of the member 32.

Preferably, the channels are regularly spaced. In a preferred embodiment, four channels are regularly spaced at about 90°. However, any number of channels may be utilized that are regularly or irregularly spaced. FIGS. 7A through 7D show alternative embodiments of the channels of the fitting of the present invention.

The channels 38 preferably have a rectangular cross-section, as shown in FIG. 1. The area of the rectangular cross-section, defined by the length 56 and the width 58 of the channel 38 of the present invention can range from about 14 mm$^2$ to about 18 mm$^2$, preferably from about 15 mm$^2$ to about 17 mm$^2$, and more preferably from about 16 mm$^2$ to about 16.5 mm$^2$. In the preferred embodiment, the area of the rectangular cross-section of the channel is about 16.3 mm$^2$.

The length of the channel may be of any length as long as the corresponding width of the channel results in the desired cross-sectional area. Preferably, the ratio of the length of the channel can range from about 14:1 to about 5:3, preferably from about 10:1.5 to about 6:2.5, and more preferably from about 8:5 to about 6.5:2. In the preferred embodiment, the ratio of the length of the channel to the width of the channel is about 7:2.33.

The receiving end 36 of the member 32 preferably is formed by cutting channels into the receiving end by cutting one channel into the receiving end with a cutting wheel, end mill or similar device, repositioning the cutting device, cutting a second channel and, if additional channels are desired, repositioning the cutting device and cutting subsequent channels.

The combination fitting in accordance with the present invention can be formed from conventional materials, such as steel, industrial grade plastics, metal alloys, composites, ceramics, or like materials.

Fluid flow is regulated in a fluid flow control system of a power steering apparatus utilizing the combination fitting of the present invention in which a hydraulic pump 12 delivers pressurized fluid through a pump outlet 14, the pressurized fluid from the pump outlet 14 enters a fluid output chamber formed in a fluid control cylinder comprising a movable fluid control piston 20 and a combination fitting 10 having a fluid-receiving end 36, an internal bore 34 therethrough and two or more channels 38 extending radially from the bore disposed in the fluid receiving end 36 of the fitting 10, at least a portion of the fluid is directed through the internal bore 34 of said combination fitting 10 toward a power steering system. A pressure-sensing orifice detects the pressure of the fluid as it flows through the fitting and communicates that pressure through passageway 42 to a low-pressure chamber 44 located at the low-pressure end 46 of the piston 20, thereby regulating the position of the piston 20 within the cylinder relative to the pressure of the fluid. Excess fluid is re-circulated through the bypass port 50 back to the pump 12.

Of course, it should be understood that a wide range of changes and modifications can be made to the embodiments described above. It is therefore intended that the foregoing description illustrates rather than limits this invention, and that it is the following claims, including all equivalents, that define this invention.

What is claimed is:

1. A method of regulating fluid flow in a power steering fluid control apparatus comprising:
   providing a hydraulic pump for the delivery of pressurized fluid through a pump outlet;
   introducing pressurized fluid from the pump outlet to a fluid output chamber formed in a fluid control cylinder comprising a movable fluid control piston and a combination fitting having a fluid-receiving end defined by an outer peripheral surface and an end surface, the combination fitting having an internal bore therethrough and a channel in fluid communication with the bore, the channel opening axially to the end surface and radially to the outer peripheral surface;
   directing at least a portion of said fluid through the internal bore of said combination fitting to a power steering system;
   detecting the pressure of the fluid with a pressure sensing orifice;
   communicating said pressure through a passageway to a low pressure chamber located at an end of the piston;
   regulating the position of the piston within the cylinder relative to the pressure of the fluid;
   delivering excess fluid to a fluid bypass port; and
   recirculating excess fluid to the pump.

2. The method of claim 1 wherein said channel further comprises a pair of radially extending channels defined on said first end of the member, the pair of channels forming a cross-shape on the end surface.

3. The method of claim 2 wherein said channels have a rectangular cross-section.

4. The method of claim 1 having two or more channels.

5. The method of claim 4 wherein the channels are regularly spaced about the bore.

6. The method of claim 5 having four channels regularly spaced at about 90° about the bore.

7. The method of claim 4 wherein the channels are irregularly spaced about the bore.

8. The method of claim 1 wherein the channel has a length and a width, wherein the length and the width of the channel define an area of from about 14 mm$^2$ to about 18 mm$^2$.

9. The method of claim 1 wherein the channel has a length and a width, wherein the length and the width of the at least one channel define an area of from about 15 mm$^2$ to about 17 mm$^2$.

10. The method of claim 1 wherein the channel has a length and a width, wherein the length and the width of the channel define an area of from about 16 mm$^2$ to about 16.5 mm$^2$.

11. The method of claim 1 wherein the channel has a length and a width, wherein the length and the width of the channel define an area of about 16.3 mm$^2$.

12. The method of claim 1 wherein the channel has a width and a length, and the ratio of the length of the channel to the width of the at least one channel is from about 14:1 to about to 5:3.

13. The method of claim 1 wherein the ratio of the length of the channel to the width of the channel is from about 10:1.5 to about 6:2.5.

14. The method of claim 1 wherein the ratio of the length of the channel to the width of the channel is about 7:2.33.

15. A method of delivering fluid flow to a power steering system, the method comprising:
    providing a hydraulic pump for the delivery of pressurized fluid through a pump outlet;
    introducing pressurized fluid from the pump outlet to a fluid output chamber formed in a fluid control cylinder having a movable fluid control piston and a combination fitting, the combination fitting having a fluid-receiving end and an internal bore extending axially therethrough, the fluid receiving end of the combination fitting having a plurality of posts extending axially and being circumferentially spaced to define a plurality of channels therebetween, the plurality of channels fluidically connected to the internal bore;
    directing at least a portion of said fluid from the fluid output chamber through one or more of the plurality of channels and through the internal bore of the combination fitting to a power steering system.

16. The method of claim 15, wherein the plurality of channels each have a rectangular cross-section.

17. The method of claim 15, wherein the channels are regularly spaced circumferentially about the bore.

18. The method of claim 15, wherein the channels are irregularly spaced circumferentially about the bore.

19. The method of claim 15, wherein the at least one channel has a length and a width, wherein the length and the width of the at least one channel define an area of from about 14 mm$^2$ to about 18 mm$^2$.

20. The method of claim 15, wherein the plurality of channels define a cross-shape on an axial end surface of the fluid receiving end.

* * * * *